United States Patent
Cherry et al.

(10) Patent No.: US 11,789,759 B2
(45) Date of Patent: Oct. 17, 2023

(54) METHOD, SYSTEM AND APPARATUS ASSISTING A USER OF A VIRTUAL ENVIRONMENT

(71) Applicant: BATON SIMULATIONS, Montreal (CA)

(72) Inventors: Sebastien Cherry, Saint-Lambert (CA); Stephane Gosselin, Montreal (CA)

(73) Assignee: BATON SIMULATIONS, Montreal (CA)

( * ) Notice: Subject to any disclaimer, the term of this patent is extended or adjusted under 35 U.S.C. 154(b) by 0 days.

(21) Appl. No.: 17/395,959

(22) Filed: Aug. 6, 2021

(65) Prior Publication Data

US 2022/0050694 A1 Feb. 17, 2022

Related U.S. Application Data

(60) Provisional application No. 63/064,720, filed on Aug. 12, 2020.

(51) Int. Cl.
*G06F 9/451* (2018.01)
*G06N 20/00* (2019.01)

(52) U.S. Cl.
CPC ............ *G06F 9/453* (2018.02); *G06N 20/00* (2019.01)

(58) Field of Classification Search
CPC ..... G06F 9/453; G06Q 10/0633; G06N 20/00
See application file for complete search history.

(56) References Cited

U.S. PATENT DOCUMENTS

| | | | |
|---|---|---|---|
| 6,262,730 B1* | 7/2001 | Horvitz | G06N 5/00 715/707 |
| 6,473,745 B2 | 10/2002 | Doerr et al. | |
| 7,386,524 B2 | 6/2008 | Hubbell et al. | |
| 8,069,434 B2 | 11/2011 | Ploesser et al. | |
| 8,897,437 B1 | 11/2014 | Tan et al. | |
| 9,659,247 B2 | 5/2017 | McGrath et al. | |
| 10,078,817 B2 | 9/2018 | Vinnakota | |

(Continued)

OTHER PUBLICATIONS

Ilie-Zudor et al., "Advanced predictive-analysis-based decision support for collaborative logistics networks", Supply Chain Management: An International Journal vol. 20, No. 4, 2015, pp. 369-388.

(Continued)

*Primary Examiner* — Roberto Borja
(74) *Attorney, Agent, or Firm* — BCF LLP

(57) ABSTRACT

The disclosed systems, and methods are directed to assisting a user of a virtual environment, the method comprising: tracking and storing user interactions of the user with a user interface associated with the virtual environment, the user interactions being associated with the user attempting to perform a task in the virtual environment; performing a background analysis of the user interactions, the background analysis comprising: inputting one or more of the tracked and stored user interactions to a machine learning algorithm (MLA) having been previously trained to identify sequence pattern of user interactions; outputting, by the MLA, one or more sequence patterns of user interactions to be associated with the tracked and stored user interactions; determining, that the user requires assistance to complete the task; and operating an assistance module to guide the user in completing the task.

20 Claims, 15 Drawing Sheets

(56) References Cited

U.S. PATENT DOCUMENTS

| | | |
|---|---|---|
| 10,565,537 B1 | 2/2020 | Askew |
| 2007/0299802 A1 | 12/2007 | Kwok |
| 2008/0126155 A1 | 5/2008 | Xu et al. |
| 2012/0004952 A1* | 1/2012 | Shimoi ................. G06Q 50/04 |
| | | 705/7.42 |
| 2012/0150859 A1 | 6/2012 | Hu |
| 2014/0071158 A1 | 3/2014 | Opitz et al. |
| 2017/0124263 A1 | 5/2017 | Crafts et al. |
| 2017/0293874 A1 | 10/2017 | Asaf |
| 2019/0317803 A1 | 10/2019 | Maheshwari et al. |
| 2019/0324553 A1* | 10/2019 | Liu ......................... H04L 51/02 |
| 2020/0019420 A1* | 1/2020 | Saimani ................. G06F 9/453 |
| 2020/0160095 A1 | 5/2020 | Weller |
| 2020/0410392 A1* | 12/2020 | Verma .................... G06F 9/453 |

OTHER PUBLICATIONS

"Accenture Launches Intelligent Automation Platform to Deliver Smarter, More Efficient Application Services that Improve Business Outcomes", M2 Presswire, Apr. 12, 2016, pdf 4 pages.

* cited by examiner

| | 402 | 404 Collective Conversion of Planned Orders: List | | 420 | 422 | 424 | |
|---|---|---|---|---|---|---|---|
| 418 Material: [  ] [Go] | | | | | | | |
| ☐ Opening Date | Material | Description | | Order Qty | Order Type | Planned Order | Production Order |
| ☐ 2019-04-30 | AA-F11 | 1kg Nuts muesli | | 48000 | PP01 | 0000002722 | |
| ☐ 2019-04-30 | AA-F11 | 1kg Nuts muesli | | 48000 | PP01 | 0000002724 | |
| ☐ 2019-04-30 | AA-F12 | 1kg Blueberries muesli | | 48000 | PP01 | 0000002726 | |
| ☐ 2019-04-30 | AA-F12 | 1kg Blueberries muesli | | 48000 | PP01 | 0000002730 | |
| ☐ 2019-04-30 | AA-F13 | 1kg Strawberries muesli | | 48000 | PP01 | 0000002734 | |
| ☐ 2019-04-30 | AA-F13 | 1kg Strawberries muesli | | 48000 | PP01 | 0000002738 | |
| ☐ 2019-04-30 | AA-F14 | 1kg Raisins muesli | | 48000 | PP01 | 0000002743 | |
| ☐ 2019-04-30 | AA-F14 | 1kg Raisins muesli | | 48000 | PP01 | 0000002749 | |

425 → [Convert]

| | | | Table Name | | | | Schema | | | Type | |
|---|---|---|---|---|---|---|---|---|---|---|---|
| | | | USER_RECORDING | | | | BATONCORE | | | ROW | Open Content... |

Columns | Indexes

| | Name | SQL Data Type | DIM | Column Store Data Type | Key | Not Null | Default | Comment |
|---|---|---|---|---|---|---|---|---|
| 1 | Customer_ID | INTEGER | | INT | (X1) | X | | |
| 2 | LANDSCAPE_NAME | NVARCHAR | 10 | STRING | (X2) | X | | |
| 3 | USER_ID | NVARCHAR | 100 | STRING | (X3) | X | | |
| 4 | SESSION_ID | NVARCHAR | 100 | STRING | | X | | |
| 5 | RECORDING_ID | NVARCHAR | 50 | STRING | | X | | |
| 6 | DATE_TIME | TIMESTAMP | | LONGDATE | (X4) | X | CURRENT_TIMESTAMP | |
| 7 | NAVIGATION_SEMANTIC_OBJECT | NVARCHAR | 100 | STRING | | X | | |
| 8 | NAVIGATION_ACTION | NVARCHAR | 100 | STRING | | X | | |
| 9 | EVENT_TYPE | NVARCHAR | 50 | STRING | | X | | |
| 10 | ELEMENT_NAME | NVARCHAR | 50 | STRING | | X | | |
| 11 | ELEMENT_ID | NVARCHAR | 500 | STRING | | | | |
| 12 | DESCRIPTION | NVARCHAR | 200 | STRING | | | | |
| 13 | COORDINATE_X | DOUBLE | | STRING | | | | |
| 14 | COORDINATE_Y | DOUBLE | | STRING | | | | |
| 15 | LANGUAGE | NVARCHAR | 2 | STRING | | | | |

FIG. 5

METHOD, SYSTEM AND APPARATUS ASSISTING A USER OF A VIRTUAL ENVIRONMENT

CROSS-REFERENCE TO RELATED APPLICATIONS

This application claims benefit to U.S. Provisional Application No. 63/064,720, entitled "METHOD, SYSTEM AND APPARATUS ASSISTING A USER OF A VIRTUAL ENVIRONMENT", filed on Aug. 12, 2020, the contents of which are incorporated by reference herein in their entirety.

FIELD OF THE INVENTION

The present invention generally relates to an enterprise resource planning (ERP) system and, in particular, to a system, method, and computing device for assisting a user of a virtual environment.

BACKGROUND

Enterprise resource planning (ERP) system is an integrated management of main business processes mediated by software and technology. The ERP systems have grown into robust offerings that provide dynamic service. In general, the ERP system is referred to as a category of business management software, typically a combination of integrated applications, that an organization can use to collect, store, manage, and interpret data from many business activities.

Generally, the ERP system uses common databases maintained by a database management system to provide an integrated and continuously updated view of core business processes. Certain ERP systems track business resources such as, cash, raw materials, production capacity or the like along with the status of business commitments such as, orders, purchase orders, and payroll or the like. The integrated applications associated with the ERP system share data across various departments (manufacturing, purchasing, sales, accounting, etc.) that provide the data.

Since it is difficult to entirely automate the ERP system, typically a human user is relied upon to operate various integrated applications associated with the ERP system. In certain implementations, the human user has to follow a series of steps or process to perform a required task. By way of example, in order to place an order of such inventory which will be getting out of stock in short order might require multiple steps.

There have been several automation techniques that have attempted to automate such steps. However, the previously implemented techniques failed to replicate the activities of the human user where certain decision making is also required along with performing the steps. At the same time, the human user may not be an expert in operating the integrated applications associated with the ERP system in their entirety. To this end, there is an interest in developing an ERP system that may help or assist the human user to operate various integrated applications associated with the ERP system in an efficient manner.

SUMMARY

Embodiments of the present technology have been developed based on developers' appreciation of shortcomings associated with the prior art.

Such shortcomings may comprise capability to replicate the activities of the human user where certain decision making is also required along with performing the steps.

In accordance with a first broad aspect of the present disclosure, there is provided a computer-implemented method for assisting a user of a virtual environment, the method comprising: tracking and storing user interactions of the user with a user interface associated with the virtual environment, the user interactions being associated with the user attempting to perform a task in the virtual environment; performing a background analysis of the user interactions, the background analysis comprising: inputting one or more of the tracked and stored user interactions to a machine learning algorithm (MLA) having been previously trained to identify sequence pattern of user interactions; outputting, by the MLA, one or more sequence patterns of user interactions to be associated with the tracked and stored user interactions; determining, based on the one or more sequence patterns of user interactions associated with the tracked and stored user interactions, that the user requires assistance to complete the task; and operating an assistance module to guide the user in completing the task.

In accordance with other non-liming embodiments of the present disclosure, the computer implemented method, wherein determining that the user requires assistance to complete the task further comprises determining the task that the user is attempting to perform.

In accordance with other non-liming embodiments of the present disclosure, the computer implemented method, further comprises correlating the one or more sequence patterns of the user interactions associated with the tracked and stored interactions while the user is attempting to perform the determined task with previously determined one or more sequence patterns associated with previously tracked and stored interactions corresponding to the determined task performed previously to determine that the user requires assistance to complete the task.

In accordance with other non-liming embodiments of the present disclosure, the computer implemented method, wherein determining that the user requires assistance to complete the task further comprises: inputting one or more sequence patterns of the user interactions associated with the task that the user is attempting to perform and one or more sequence patterns of the user interactions associated with the previously performed task to a second MLA having been previously trained to identify sequence pattern of user interactions; and outputting, by the MLA, a status determining that the user requires assistance.

In accordance with other non-liming embodiments of the present disclosure, the computer implemented method, wherein determining that the user requires assistance to complete the task further comprises comparing a time taken by the user attempting to perform the task with a previous time taken to perform the task.

In accordance with other non-liming embodiments of the present disclosure, the computer implemented method, wherein sequence pattern includes a sequence of one or more steps performed to in order to accomplish the task.

In accordance with other non-liming embodiments of the present disclosure, the computer implemented method, wherein determining that the user requires assistance to complete the task further comprises providing a notification on the user interface.

In accordance with other non-liming embodiments of the present disclosure, the computer implemented method, wherein operating the assistance module is in accordance to a user's response to the notification on the user interface.

In accordance with other non-liming embodiments of the present disclosure, the computer implemented method, wherein operating the assistance module includes providing, by the operating module, a guidance to perform steps associated with the task.

In accordance with other non-liming embodiments of the present disclosure, the computer implemented method, wherein the guidance to perform steps associated with the task is based on previously performed steps associated with the task.

In accordance with other non-liming embodiments of the present disclosure, the computer implemented method, wherein the guidance includes at least one of: i) a textual guidance, ii) an audio guidance, or iii) a video guidance.

In accordance with other non-liming embodiments of the present disclosure, the computer implemented method, wherein operating the assistance module is in accordance to a user's request.

In accordance with other non-liming embodiments of the present disclosure, the computer implemented method, wherein the user's request is at least one of: i) a request submitted by one of the users using the user interface or ii) a gesture based request.

In accordance with other non-liming embodiments of the present disclosure, the computer implemented method further comprises detecting by a previously trained MLA to detect gesture of the users making gesture based user's request.

In accordance with other non-liming embodiments of the present disclosure, the computer implemented method, wherein the gesture based request includes at least one of: i) audio request or ii) body movement based request.

In accordance with other non-liming embodiments of the present disclosure, the computer implemented method, wherein the user interface is a graphical user interface.

In accordance with other non-liming embodiments of the present disclosure, the computer implemented method, wherein the virtual environment is a transactional application In accordance with a second broad aspect of the present disclosure, there is provided a, system for assisting a user of a virtual environment, the system comprising: a processor; a non-transitory computer-readable medium comprising instructions, the processor; upon executing the instructions, being configured to cause the processor to: track and store user interactions of the user with a user interface associated with the virtual environment, the user interactions being associated with the user attempting to perform a task in the virtual environment; perform a background analysis of the user interactions, the background analysis comprising: inputting one or more of the tracked and stored user interactions to a machine learning algorithm (MLA) having been previously trained to identify sequence pattern of user interactions; outputting, by the MLA, one or more sequence patterns of user interactions to be associated with the tracked and stored user interactions; determine, based on the one or more sequence patterns of user interactions associated with the tracked and stored user interactions, that the user requires assistance to complete the task; and operate an assistance module to guide the user in completing the task.

BRIEF DESCRIPTION OF THE FIGURES

Further features and advantages of the present disclosure will become apparent from the following detailed description, taken in combination with the appended drawings, in which:

FIG. 3A-3G illustrate examples of a graphic user interface (GUI) associated with the ERP system, in accordance with various embodiments of present disclosure;

FIG. 5 illustrates an example of user interactions log in accordance with various embodiments of present disclosure;

Figure 1:
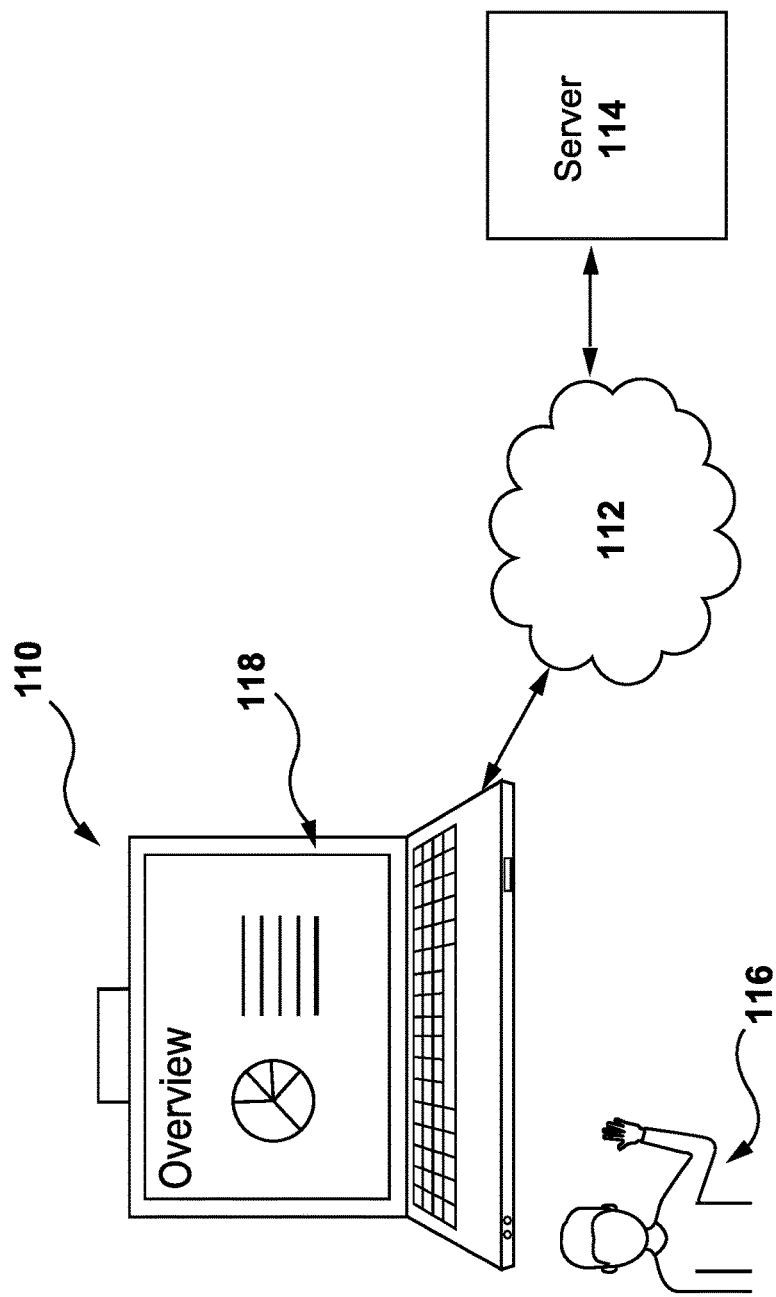
FIG. 1 depicts an enterprise resource planning (ERP) system, in accordance with various embodiments of the present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes a system, method, and computing device for assisting a user of a virtual environment.

In the context of the present specification, a "server" is a physical machine, a virtual machine, or computer program (e.g. software) running on appropriate physical or virtual machine, and is capable of receiving requests from "clients", and carrying out those requests, or causing those requests to be carried out. The physical machine may be one physical computer or one physical computer system, but neither is required to be the case with respect to the present technology. A virtual machine is a virtual representation of one physical machine or one physical computer system. In the present context, the use of the expression a "server" is not intended to mean that every task (e.g. received instructions or requests) or any particular task will have been received, carried out, or caused to be carried out, by the same server (i.e. the same software and/or machine); it is intended to mean that any number of software modules, routines or functions, or hardware devices may be involved in receiving/sending, carrying out or causing to be carried out any task or request, or the consequences of any task or request; and all of this software and hardware may be one server or multiple servers, both of which are included within the expression "one server".

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, the expression "information" includes information of any nature or kind. Thus information includes, but is not limited to audiovisual works (images, movies, sound records, presentations, etc.), data (location data, numerical data, etc.), text (opinions, comments, questions, messages, etc.), documents, spreadsheets, etc.

In the context of the present specification, unless provided expressly otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU), a tensor processor unit (TPU), a neural processing unit (NPU). Moreover, explicit use of the term "processor" should not be construed to refer exclusively to hardware capable of executing software, and may implicitly include, without limitation, an arithmetic and logic unit, a control unit, and a memory unit for storing instructions, data, and intermediate results, and a hardware accelerator in the form of an application specific-integrated circuit or field programmable gate array configured to perform hardware acceleration. Other hardware, conventional and/or custom, may also be included.

Software modules, simply modules, or applications, which are implied to be software, may be represented herein as any combination of flowchart elements or other elements indicating performance of process steps and/or textual description. Such modules and applications may be executed by hardware that is expressly or implicitly shown.

With these fundamentals in place, the instant disclosure is directed to address at least some of the deficiencies of the current technology. In particular, the instant disclosure describes a system, method, and computing device for assisting a user of a virtual environment.

FIG. 1 depicts an enterprise resource planning (ERP) system 100, in accordance with an embodiment of the present disclosure. The ERP system 100 may include multiple client devices 110 (for the purpose of simplicity only one client device 110 has been illustrated) located and different geographic locations that are configured to communicate with each other via a communication network 112 and an ERP server 114. The multiple client devices 110 may be associated with (e.g., used by) users (i.e., user 116) of the ERP system 100. Although FIG. 1 shows one client device 110 associated with one user 116, it will be appreciated that in alternative embodiments, the ERP system 100 may include any number of client devices 110 associated with any number of users 116. Also, in other alternative embodiments, the client device 110 may be associated with multiple users 116.

Figure 2A:
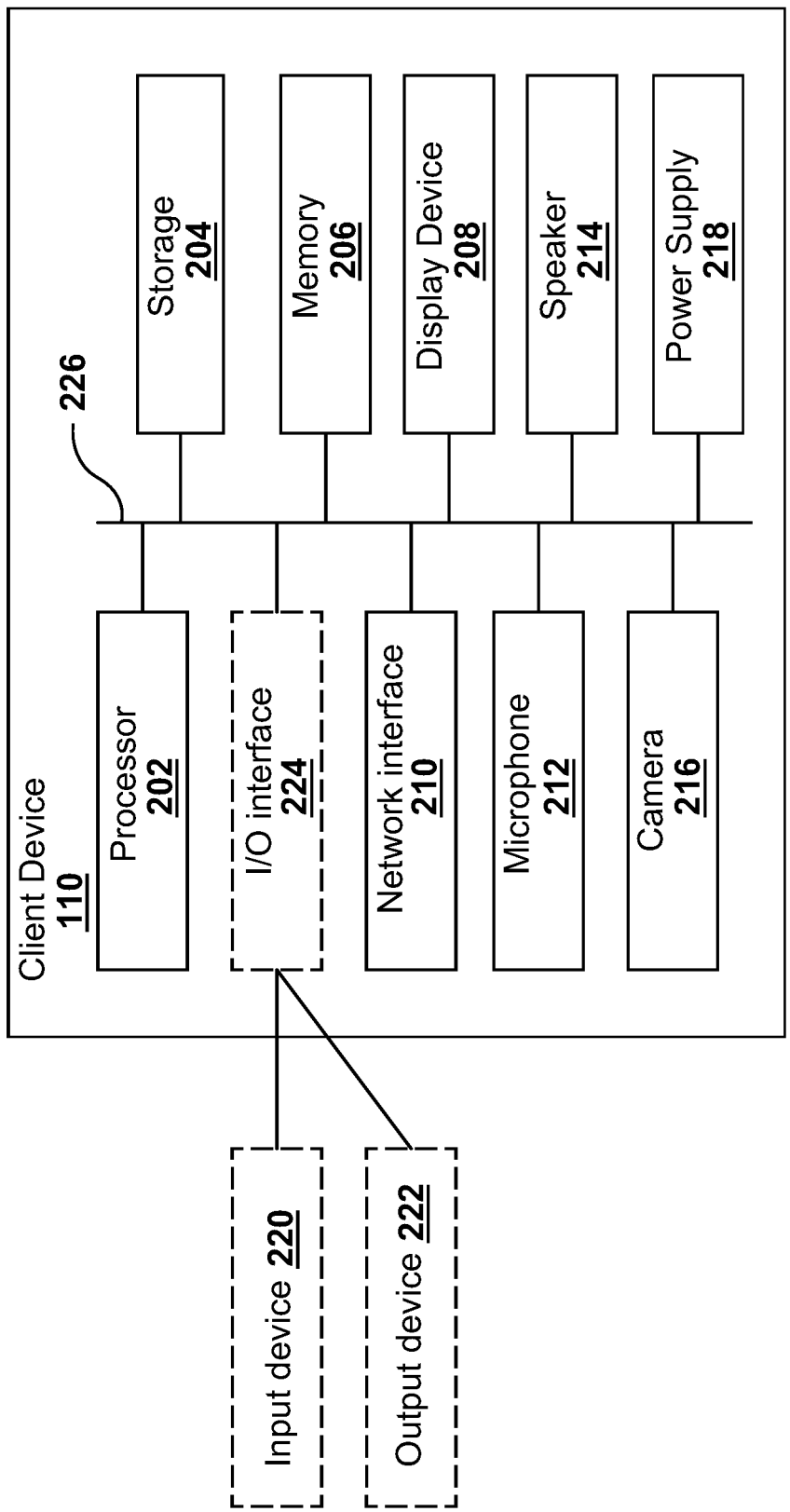
FIG. 2A depicts a high level functional block diagram of a client device of the ERP system of FIG. 1, in accordance with various embodiments of the present disclosure.

FIG. 2A depicts a high level functional block diagram of the client device 110 in accordance with an embodiment of the present disclosure. The client device 110 may be any suitable type of computing device, including desktop computer, laptop computer, tablet, smartphone, portable electronic device, mobile computing device, and the like. The client device 110 includes multiple components, including a processor 202 that controls the overall operation of the client device 110. The processor 202 is coupled to and interacts with other components of the client device 110, including one or more storage units 204, one or more memories 206, a display device 208 (hereinafter referred to as display 208), a network interface 210, a microphone 212, and a speaker 214, and camera 216 (interchangeably used with image sensor 216). The client device 110 also includes a power supply 218 that powers the components of the client device 110, including the memory 206, the display 208, the network interface 210, the microphone 212, the speaker 214, and the camera 216. The power supply 218 may include a battery, a power pack, micro fuel cells and like, however, in other embodiments, the power supply 218 may include a port (not shown) to an external power supply and a power adaptor (not shown), such as an alternating current to direct current (AC-to-DC) adopter that provides power to components of the client device 110. Optionally, the client device 110 includes one or more input devices 220, one or more output devices 222 and an I/O interface 222.

The processor 202 of the client device 110 may include one or more of a central processing unit (CPU), an accelerator, a microprocessor, a graphics processing unit (GPU), a tensor processing unit (TPU), a neural processing unit (NPU), an application-specific integrated circuit (ASIC), a field-programmable gate array (FPGA), a dedicated logic circuitry, a dedicated artificial intelligence processor unit, or combinations thereof.

The processor 202 is configured to communicate with the storage unit 204, which may include a mass storage unit such as a solid state drive, a hard disk drive, a magnetic disk drive and/or an optical disk drive. The processor 202 is also configured to communicate with the memory(ies) 206, which may include volatile memory (e.g. random access memory (RAM)) and non-volatile or non-transitory memory (e.g., a flash memory, magnetic storage, and/or a read-only memory (ROM)). The non-transitory memory(ies) store applications or programs that include software instructions for execution by the processor 202, such as to carry out examples described in the present disclosure. The non-transitory memory store an ERP application as described in further detail below. Examples of non-transitory computer readable media include a RAM, a ROM, an erasable programmable ROM (EPROM), an electrically erasable programmable ROM (EEPROM), a flash memory, a CD-ROM, or other portable memory storage.

The processor 202 is also configured to communicate with the display 208, which includes any one of flat panel display (e.g. liquid crystal display, a plasma display, a light emitting diode (LED) display, an organic light emitting diode display (OLED)), touchscreen display such as a capacitive, resistance, surface acoustic wave (SAW) or optical touchscreen display, and the like.

The processor 202 is further configured to interact with the network interface 210. The network interface 210 may include one or more radios configured for wireless communications (e.g. cellular or WiFi communications) with the communication network 112, or one or more network adaptors configured for wired communications with the communication network 112. In general, the network interface 210 is configured to correspond with the network architecture of that is used to implement a link for communications between the client device 110 and the communication network 112. The communication network 112 may be internet, local area network, wide area network or the like.

The processor 202 is further configured to interact with the microphone 212, the speaker 214, and the camera 216. The microphone 210 includes any suitable transducer that converts sound to audio signals and provide the audio signals to the processor 202 for processing and/or transmission to other client devices 110. The speaker 214 includes any suitable transducer receives audio signal from the processor 202 and converts an audio signal received from the processor 202 into sound waves. The camera 216 is configured to capture video (e.g. a sequence of digital images) in a field of view of the camera 216 and provide the captured video to the processor 202 for processing. The camera 216 may be any suitable digital camera, such as a high definition image camera, an infrared camera, a stereo camera and the like. In some embodiments, the microphone 210, the speaker 214, and the camera 216 may be internally integrated to the client device 110. In other embodiments, the microphone 210, the speaker 214, and the camera 216 may be coupled external to the client device 110.

Optionally, the processor 202 may communicate with an input/output (I/O) interfaces 222, which may enable interfacing the one or more input devices 220 (e.g., a keyboard, a mouse, a j joystick, trackball, fingerprint detector and the like) and/or output devices 222 (e.g., a printer, peripheral display device, and the like).

The client device 110 also includes a bus 226 providing communication among the components of the client device 110, including the processor 202, the memory 206, the display 208, the network interface 210, the microphone 212, the speaker 216, and the camera 216. The bus 226 may be any suitable bus architecture including, for example, a memory bus, a peripheral bus or a video bus.

Figure 2B:
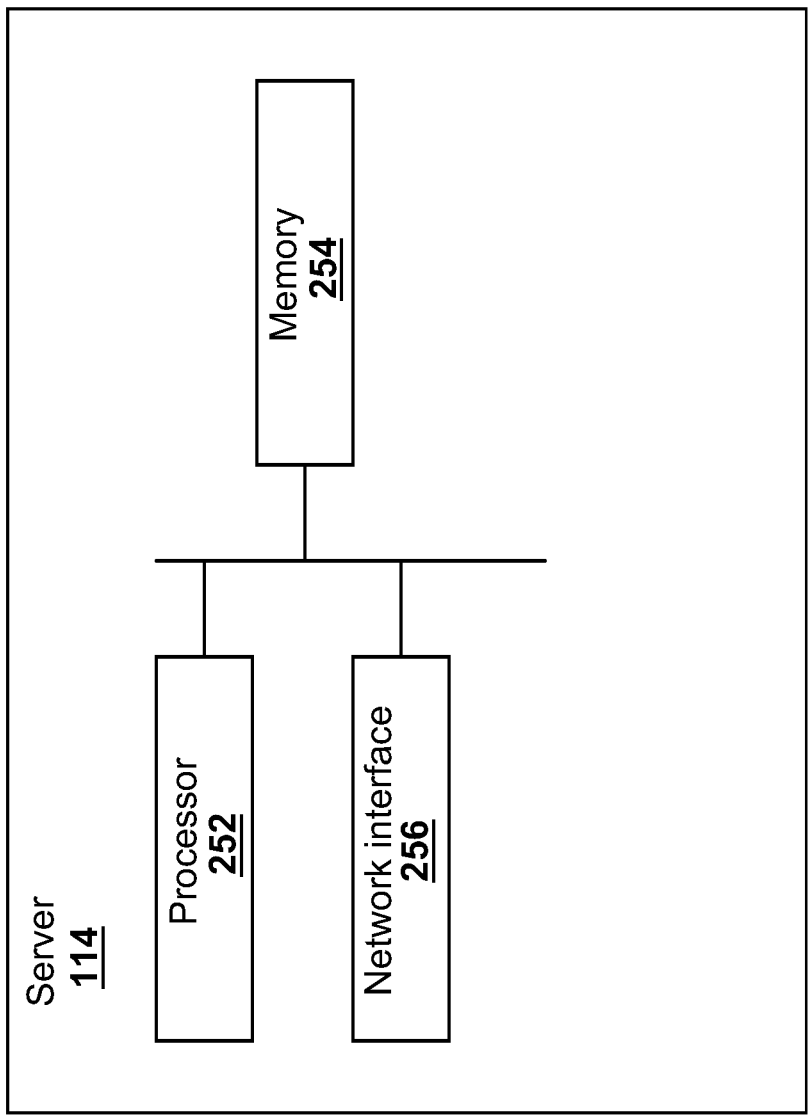
FIG. 2B depicts a high level functional block diagram of an ERP server of the ERP system of FIG. 1 in accordance with various embodiments of the present disclosure.

FIG. 2B depicts a high level functional block diagram of the ERP server 114 in accordance with an embodiment of the present disclosure. In this embodiment, the ERP server 114 is a physical machine (e.g. a physical server) or virtual machine (e.g. a virtual server) that executes ERP software to enable the client devices 110 to communicate with the server 114. The ERP server 114 includes a processor 252, a memory 254, and a network interface 256.

The processor 252 of the ERP server 114 may include one or more of a CPU, an accelerator, a microprocessor, a GPU, an ASIC, a FPGA, a dedicated logic circuitry, a dedicated artificial intelligence processor unit, or combinations thereof.

The memory 254 may include volatile memory (e.g. RAM) and non-volatile or non-transitory memory (e.g., a flash memory, magnetic storage, and/or a ROM). The non-transitory memory(ies) stores a platform that controls the overall operation of the ERP server 114. The platform, when executed by the processor 252, implements an ERP service.

The platform stores in the memory a unique identifier for each user of the ERP service and manages the unique identifier or each user of the ERP service. The unique identifier for a user may be a username or an email address of the user. A password may also be associated with the unique identifier for a user and stored in the memory 254.

The network interface 256 may include one or more radios configured for wireless communications with the communication network 112, or one or more network adaptors configured for wired communications with the communication network 112. In general, the network interface 256 is configured to correspond with the network architecture of that is used to implement a link for communications between the ERP server 114 and the communication network 112.

It is to be noted that the ERP server 114 is shown as a standalone computer. However, the implementation of various other embodiments of the present disclosure may include any client-server model where client devices may run a client version of the ERP software. Other examples of the server 250 may include a distributed computing system that runs the server version of the ERP software, a virtual machine (or virtual machines) instantiated by the infrastructure of a public or private cloud, or a cloud service provider that provides the ERP software as a service (SaaS). Such implementations or any other similar implementation should not limit the scope of present disclosure.

In other non-limiting embodiments, the client device 110 may use a web browser, such as, for example, Chrome™, Safari™, Mozilla™, or the like to facilitate ERP services. It is to be noted that how the client devices 110 are configured to facilitate ERP services should not limit the scope of the present disclosure by any means.

Returning to FIG. 1, in certain embodiments, the ERP system 100 may be implemented any suitable virtual environment (e.g. transactional applications) and may facilitate any suitable user interface to act as a bridge between the ERP system 100 and the user 116. In certain embodiments, the user interface may a graphic user interface (GUI) 118. It is to be noted that without limiting the scope of present disclosure, the GUI 118 may be based on any other suitable techniques.

Figure 3A:
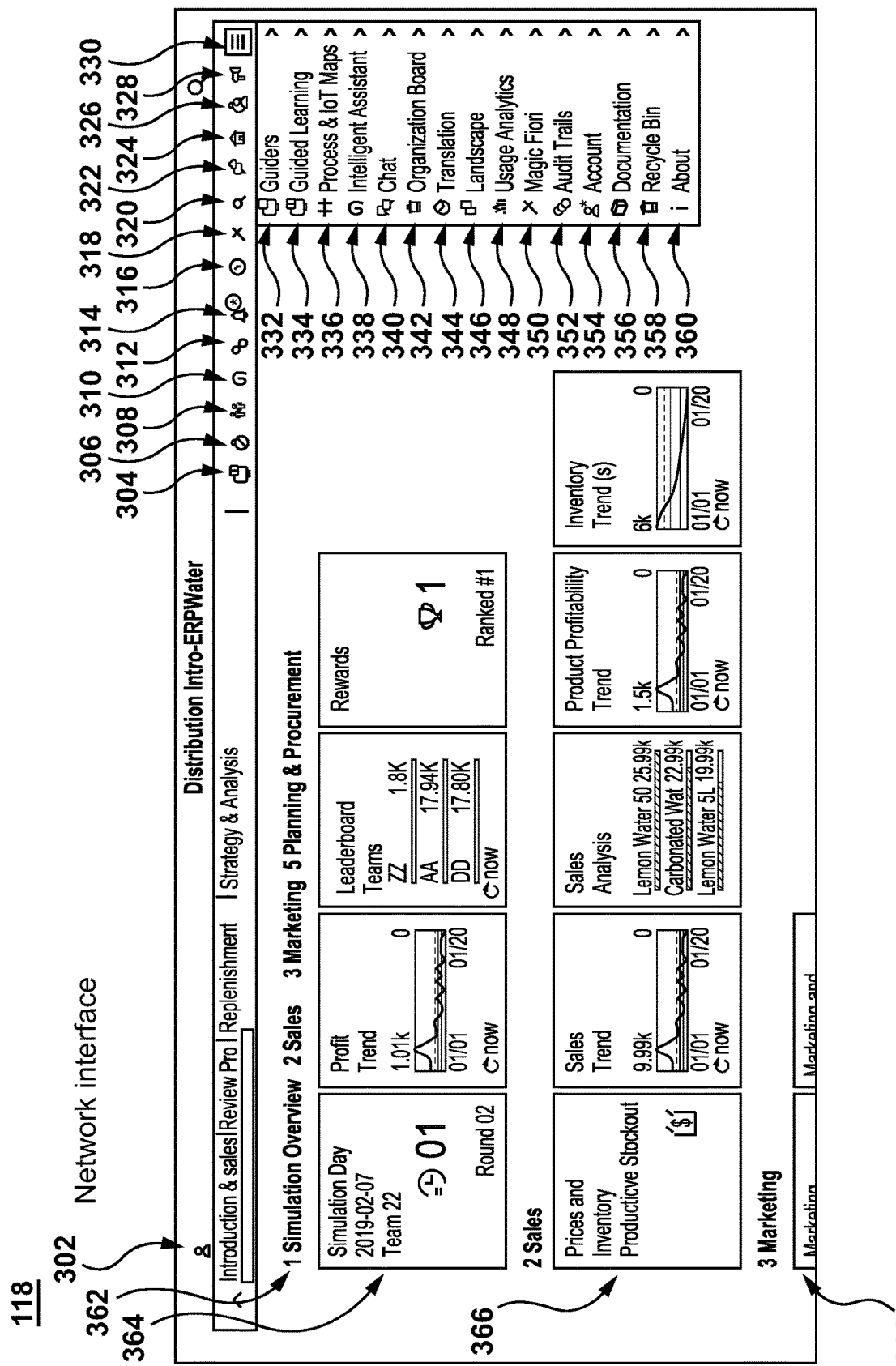

FIG. 3A illustrates an example of the GUI 118 associated with the ERP system 100, in accordance with various embodiments of present disclosure. The GUI 118 may provide the user 116 with many options. By way of example, to access the ERP system 100, in certain embodiments the user 116 may have to validate his/her credentials such that the user 116 is an authentic user of the ERP system 100. To this end, the user may select an option 302 which may prompt the user 116 to enter the credentials such as user identification (ID), password or the like. Once the ERP system 100 verifies the credentials, the user 116 may now be able to access various services associated with the ERP system 100.

Other options provided by the GUI 118 may include but are not limited to courses & tutorials 304, guided tours 306, process & IoT viewer 308, intelligent assistant 310, support chat 312, notifications 314, frequently asked questions 316, magic fiori 318, search 320, collaboration room 322, organizing board 324, user settings 326, suggestions 328, and content authoring menu 330.

In certain embodiments, the content authoring menu 330 may provide access to system configuration options. Through content authoring menu 330, the user 116 may be able to configure fiori magic, create Guiders (Contextual Help), create courses & tutorials, design & develop process flow diagrams, configure intelligent assistant, configure chat support functions, configure translation hub and services, configure landscape transport, access account information. In certain embodiments, the content authoring menu may be expanded to provide further options including guiders 332, configure guided learning 334, configure process & IoT maps 336, configure intelligent assistant 338, configure chat 340, configure organization board 342, configure translation 344, configure landscape 346, usage analytics 348, configure magic fiori 350, audit trails 352, access account information 354, documentation 356, recycle bin 358, and about 360.

Along with the options 302-360, the GUI 118 may also provide a dashboard 362 that includes various sub applications integrated together such as an overview application 364, a sales application 366, a marketing application 368, or the like. In certain embodiments, the GUI 118 may provide a scrolling option to further display other sub applications such as finance application, planning and procurement application, human resource application or the like.

In one representative scenario, the ERP system 100 may be based on SAP S/4HANA technology. By way of example, the ERP system 100 and the GUI 118 corresponds to manufacturing such as manufacturing of muesli cereal and selling it to grocery stores and large hyper markets. However, it will be appreciated that the ERP system 100 may not be limited to manufacturing business requirement, rather the ERP system 100 may include any suitable business requirements including but not limited corporate performance and governance, sales, customer relationship management (CRM), supplier relationship management (SRM), product life cycle management (PLM), supply chain management (SCM), accounting, human resources or the like.

Figure 3B:
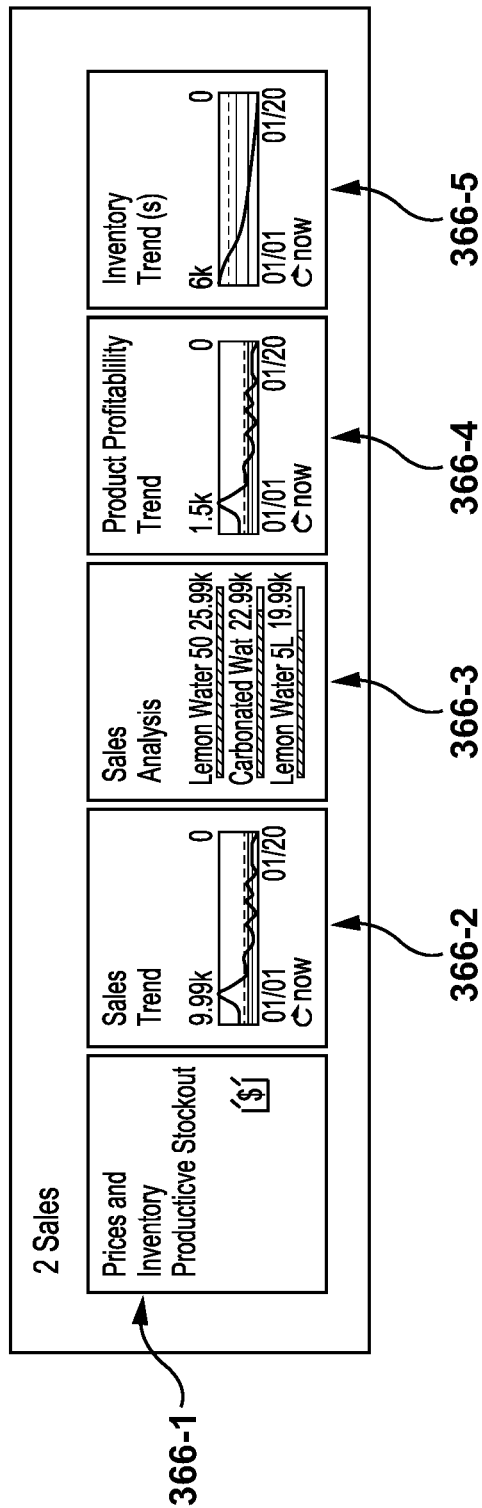

By way of example, in order to set an appropriate selling price of a material, for example, nuts muesli, blueberries muesli, strawberries muesli, raisins muesli or the like in this representative scenario, the user 116 associated with sales may select the sales application 366. FIG. 3B illustrates an extract of the sales application 366 from the GUI 118. As shown, the extract of the sales application 366 includes a prices and inventory application 366-1 along with other supporting applications embedded with rich analytics to assist in decision making. Such supporting applications may include but are not limited to sales trend application 366-2, sales analysis application 366-3, product profitability trend 366-4, and inventory trend 366-5.

Figure 3C:
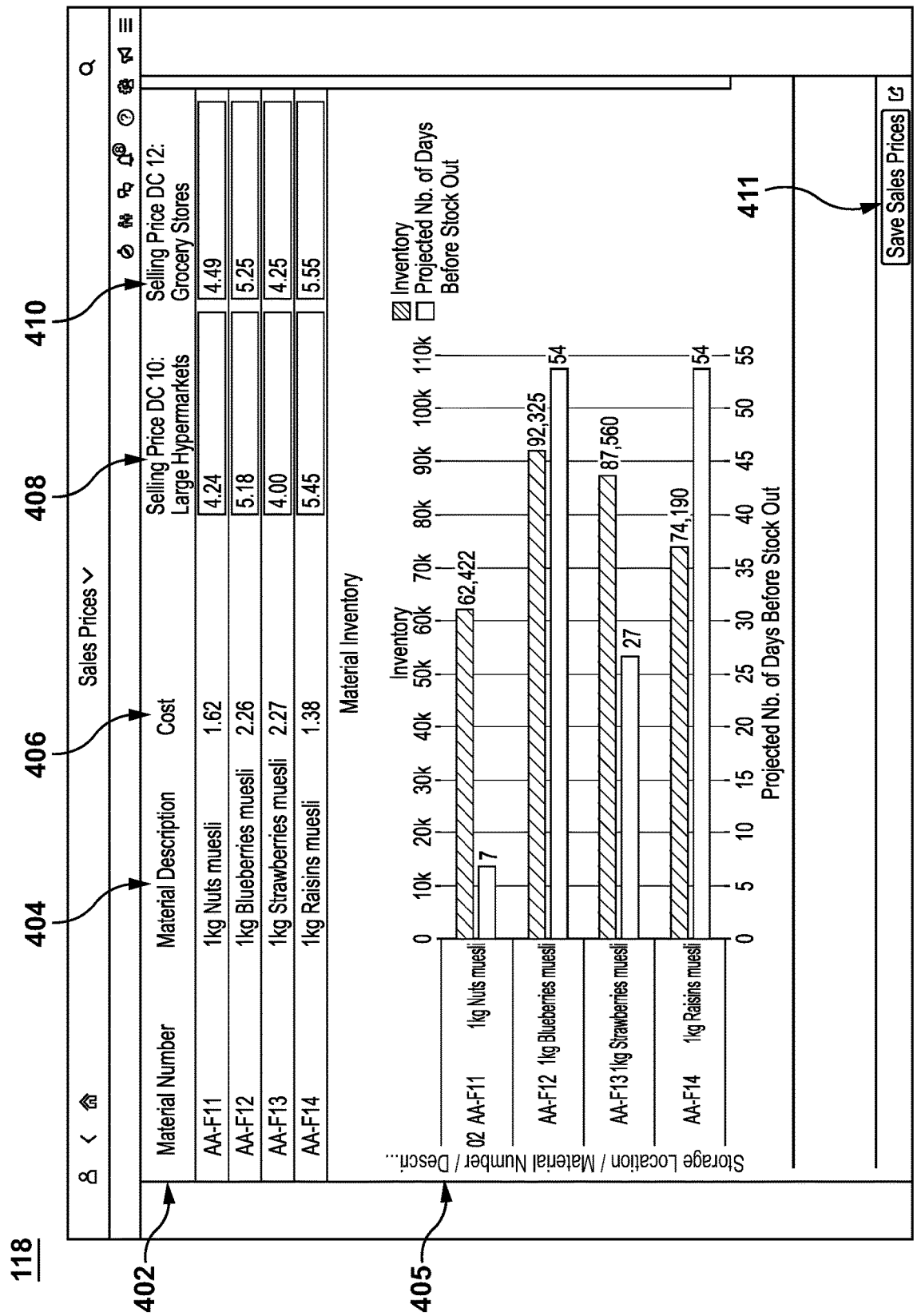

To change or set an appropriate selling price of a material, the user 116 may select the prices and inventory application 366-1. FIG. 3C illustrates the GUI 118 associated with the prices and inventory application 366-1. As shown, the GUI 118 associated with the prices and inventory application 366-1 may include a material number 402, a material description 404, an infographic 405, a material cost 406, a selling price for large hypermarket 408, a selling for price grocery store 410, and a save sales price button 411.

The infographic 405 may represent the present inventory of the materials and an estimate of number of days before the materials may be out of stock. In certain embodiments, based on the information in the infographic, the user 116 may make a change to the price of certain material. For example, the user 116 observed that the sales of blueberries muesli is less than as planned, due to which the stock of blueberries muesli and number of days before it goes out of stock is more than as planned. To this end, the user 116 may want to reduce to the selling price of the blueberries muesli. In certain embodiments, the user may set a selling price for large hypermarket 408 different from a selling for price grocery store 410 based on the inventory of the blueberries muesli. The user 116 may save the changed prices by clicking the save sales price button 411.

Figure 3D:
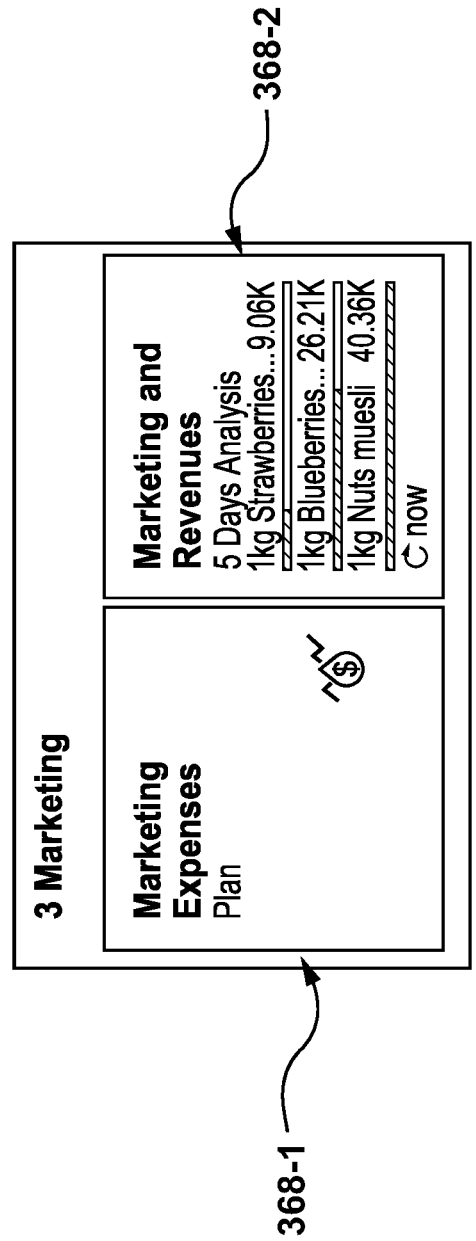

Once the prices of the blueberries muesli have been changed, the user 116 may want set a marketing budget, in order to promote the blueberries muesli and its reduced price. To this end, the user 116 may select the marketing application 368. FIG. 3D illustrates an extract of the marketing application 368 from the GUI 118. As shown, the extract of the marketing application 368 may include a marketing expenses application 368-1 along with a supporting application such as, a marketing and revenues application 368-2.

Figure 3E:
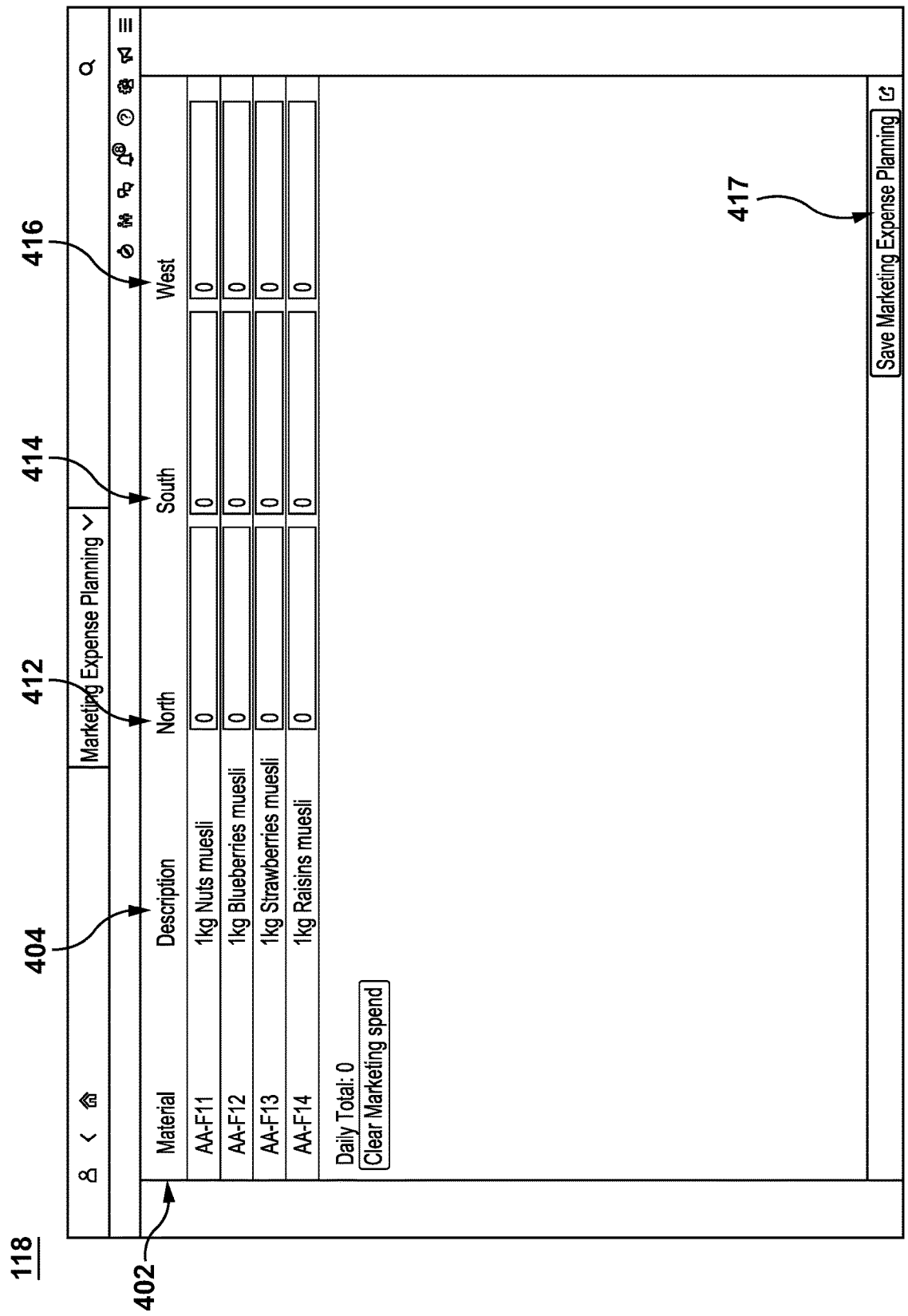

To set the marketing budget, the user 116 may select the marketing expenses application 368-1. FIG. 3E illustrates the GUI 118 associated with the marketing expenses application 368-1. As shown, the GUI 118 associated with the marketing expenses application 368-1 may include the material number 402, the material description 404, north region 412, south region 414, west region 416, and a save marketing expense planning button 417.

The user 116 may allocate a region wise budget for the marketing. By way of example, the user 116 may allocate separately a marketing budget for north region 412, south region 414, and west region 416 corresponding to the blueberries muesli and save the budget by clicking save marketing expense planning button 417.

Figure 3F:
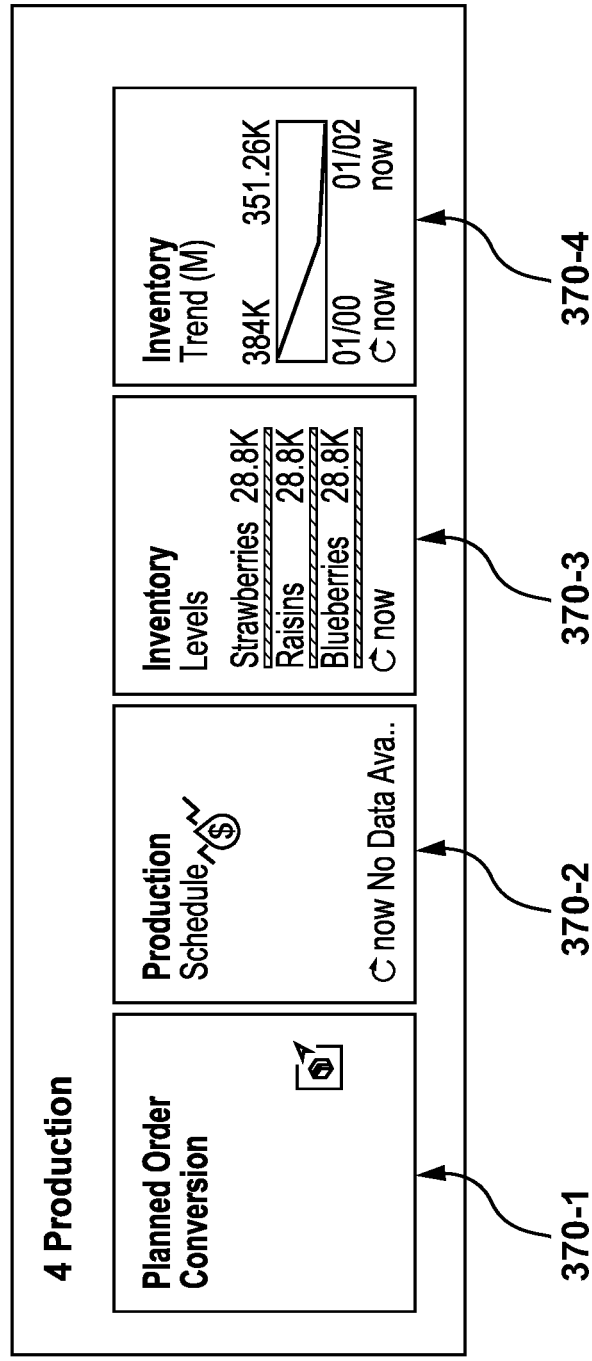

Returning to FIG. 3C, in yet another example, the user 116 may observe that the nuts muesli is having a good sale, but the inventory may be out of stock in short order. To this end, the user 116 may want to place the order for nuts muesli to avoid getting out of stock. To this end, the user 116 may select the production application 370. FIG. 3F illustrates an extract of the production application 370 from the GUI 118. As shown, the extract of the production application 370 may include a planned order conversion application 370-1 along with supporting applications such as, a production schedule 370-2, an inventory level 370-3, an inventory trend 370-4 or the like.

To place the order, the user 116 may select the planned order conversion application 370-1. FIG. 3G illustrates the GUI 118 associated with the planned order conversion application 370-1. As shown, the GUI 118 associated with the planned order conversion application 370-1 may include the material number 402, the material description 404, an order opening date 418, an order quantity 420, an order type 422, planned order number 424, and an order convert button 425. The user 116 may select the planned order associated with the nuts muesli and may place the order by clicking the order convert button 425.

It is to be noted that the GUI 118 and the associated applications such as, sales application 366, marketing application 368, production application 370 or the like have been illustrated as examples and any type of GUI and any number of applications may be associated with the ERP system 100.

Also, in certain embodiments, the user 116 may be an expert user of the ERP system 100. That is, the user 116 may be aware of all the functionalities associated with the ERP system 100 as presented by the GUI 118 and may have decision making capabilities. The expert user 116 may be capable of performing various tasks and/or a series of tasks without much supervision or assistance. However, in certain scenarios, the user 116 may not be an expert user (e.g. a new user of the ERP system) and may require certain assistance to perform various tasks and/or the series of tasks. To counter such situations, in certain embodiments, the ERP system 100 may provide an intelligent assistance system to assist each user 116 while performing various tasks.

Figure 4:
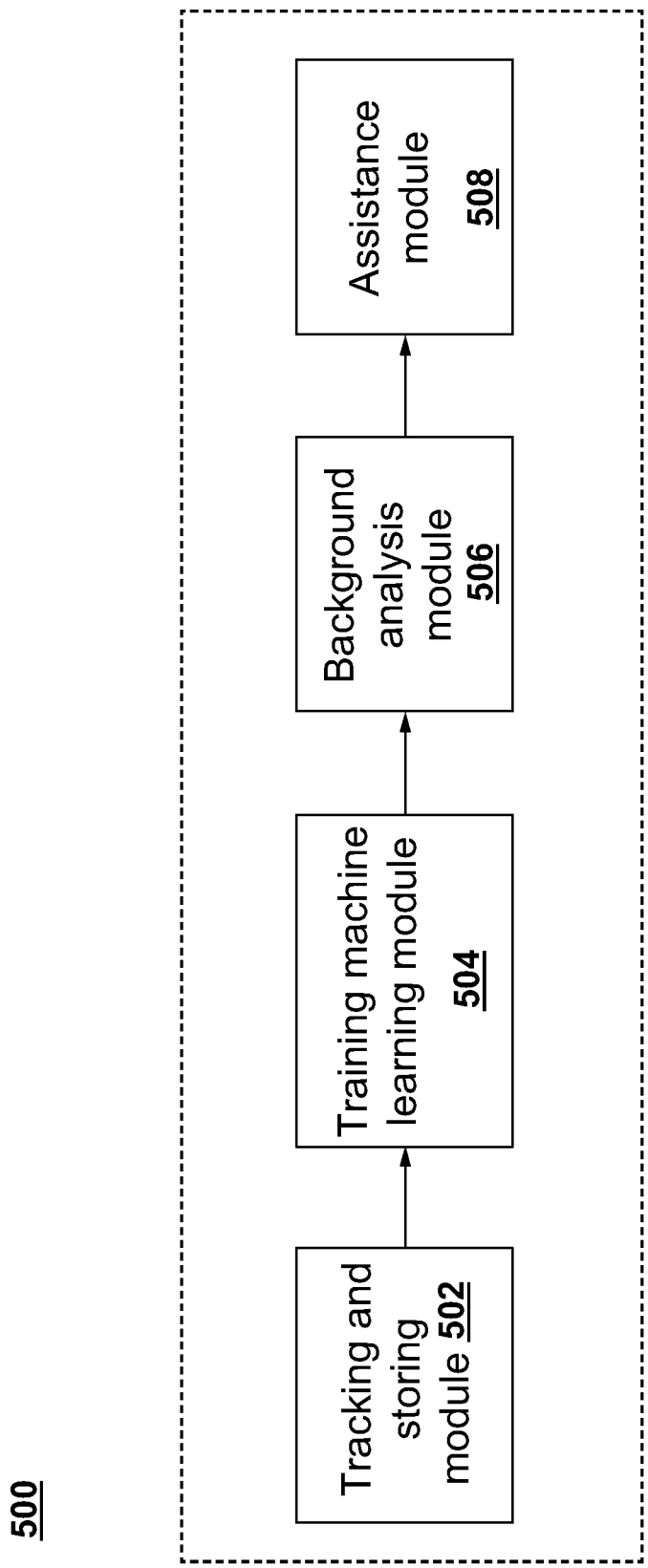
FIG. 4 illustrates an intelligent assistance system, in accordance with various embodiments of present disclosure.

With that being said, FIG. 4 illustrates an intelligent assistance system 500, in accordance with various embodiments of present disclosure. As shown, the intelligent assistance system 500 may include a tracking and storing module 502, a training machine learning module 504, a background analysis module 506, and an assistance module 508. It is to be noted that the intelligent assistance system 500 may include other modules and components. However, for the sake of simplicity, such modules and components have not been illustrated in FIG. 4.

In certain embodiments, the intelligent assistance system 500 and the associated modules may be implemented on the client device 110. In other embodiments, the intelligent assistance system 500 and the associated modules may be implemented on the server 114. In yet another embodiment, some of the modules of the intelligent assistance system 500 may be implemented on the client device while other modules may be implemented on the server 114. It is contemplated that where the intelligent assistance system 500 has been implemented should not limit the scope present disclosure.

In certain embodiment, the tracking and storing module 502 may be configured to keep a track of interactions of the user 116 with the GUI 118 and store the user interactions (UIs) as logs in a memory associated with the client device 110 and/or server 114. The UIs being associated with the user 116 attempting to perform a task.

In certain embodiments, the UIs may include for example, navigation of the user 116 within the GUI 118. The navigation may include but not limited to clicks (e.g. mouse clicks touch inputs on touch screens or the like) by the user 116 on the elements of GUI 118 (e.g. button, dropdown selection, checkbox, or the like), inputs (e.g. text inputs, numeral inputs or the like) from the user 116, sequence of the actions performed or the like. The captured UIs may be dumped into logs, which may be saved locally on the client device 110 and/or in the memory/databases associated with the server 114.

As previously discussed, the user 116 may perform various tasks on the GUI 118. For example, changing or setting a price of a material (e.g. blueberries muesli). To this end, the user 116 may navigate and interact with the GUI 118. The UIs including navigations may be stored as an associated UIs log in the memory (e.g. storage 204, memory 206, memory 254 or the like). Various embodiments include several such tasks (e.g. setting marketing budget, preparing procurement orders, human resource related activities or the like) performed by the user 116. The tracking and storing module 502 may be configured to track and store all the UIs associated with the different tasks performed by the user 116 as UIs log. FIG. 5 illustrates an example of UIs logs 600 in accordance with various embodiments of present disclosure.

Returning to FIG. 4, in certain embodiments, the training machine learning module 504 may be configured to train sequential pattern mining models or machine learning algorithms (MLAs) for identifying a task and the associated steps performed by the user 116 based on the UIs logs. Further, in certain embodiments, the training machine learning module 504 may also be configured to train the sequential pattern mining models or MLAs for determining if the user 116 required assistance while performing a particular task or to complete the task, determining if the user 116 is requesting for assistance, providing the requested assistance to the user 116 or the like. It is to be noted that the sequential pattern mining is technique of data mining concerned with finding statistically relevant patterns between data examples where the input to a suitable sequential pattern mining algorithm may be provided in the form of a sequence.

Figure 6:
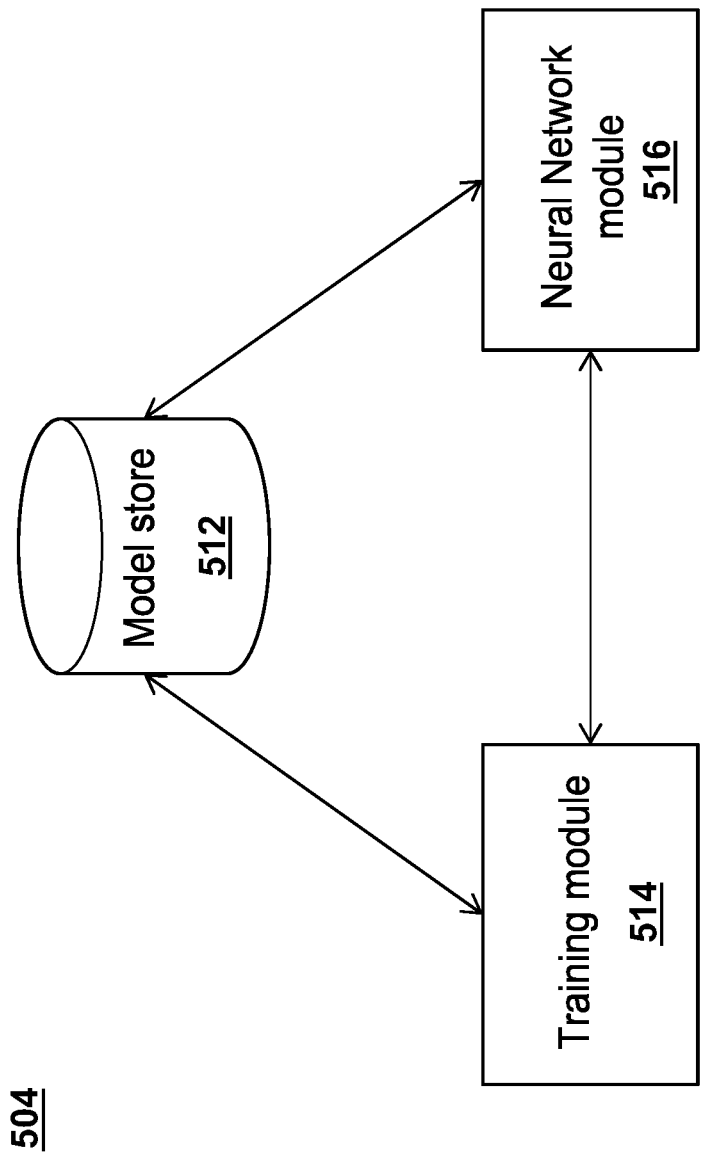
FIG. 6 illustrates a training machine learning module, in accordance with various embodiments of the present technology.

FIG. 6 illustrates a training machine learning module 504, in accordance with various embodiments of the present technology. As shown, the MLA module 504 may include a model store 512, a training module 514, and a neural network module 516. It is to be noted that other components may be present but have not been illustrated for the purpose of simplicity.

The model store 512 may store trained and/or untrained sequential pattern mining models or MLAs. The model store 512 may provide the untrained sequential pattern mining models to the training module 514, and provides the trained sequential pattern mining models or MLAs to the neural network module 516. In one embodiment, a model stored in the model store 512 comprises weights of the model and instructions associated with the model, for example, instructions for processing an input and generating the output for the model.

In certain non-limiting embodiments while tracking and storing UIs logs, the tracking and storing module 502 may add labels to the UIs logs. The labels may represent an identified task and the associated steps associated with the UIs logs. For example, the UIs logs may comprise a set of UIs labelled with the type of tasks and the associated steps for predicting the future tasks performed by the user 116.

The training module 514 may train one or more sequential pattern mining models and/or MLAs using the UIs logs including all the navigations and interactions of the user 116 with the GUI 118. In so doing, the training module 514 may assess the UIs logs stored in the memory (e.g. storage 204, memory 206, memory 254 or the like).

The training module 514 may parse the UIs logs to find independent sequences, i.e. sequence of the actions performed and being part of the same transaction. As an example, in the ERP system 100, a new sequence of actions may initialized by clicking on sub applications integrated together such as the overview application 364, the sales application 366, the marketing application 368, or the like that serves the desired function (transaction). The sequence may end when the user 116 may return to the dashboard 362. As another example, the sequence of actions may be bounded by a time interval within which actions are considered belonging to the same transaction.

The training module 514 may parse the UIs logs to remove "noise" in the data, i.e. to remove non-frequent actions that should not be considered as part of a sequence pattern. This may be achieved by counting the occurrences of actions in the UIs logs.

By way of example, the training module 514 may provide an input (e.g., the UIs logs) to the sequential pattern mining model and/or MLA. The sequential pattern mining model and/or MLA may generate a corresponding output (e.g., an identified task, identified sequence patterns including the associated steps to perform the task). The training module 514 may compare the output of the sequential pattern mining model and/or MLA with the expected label associated with the input to determine a measure of error in the output. The errors observed in the outputs of various inputs are fed back into the sequential pattern mining model and/or MLA to adjust the various parameters (for instance, weights associated with the nodes and the connections in the case of a neural network algorithm) of the sequential pattern mining model and/or MLA. This process is repeated iteratively until a satisfactory performance is obtained. In one non-limiting example, the process of adjusting the algorithm parameters may be repeated iteratively until an aggregate metric based on the error is determined to be below a certain threshold value. While in another non-limiting example, the process of adjusting the algorithm parameters may be repeated for a predetermined number of iterations, for example, first 1000 iterations. The training module 514 repeats the process of training the sequential pattern mining model and/or MLA through multiple iterations.

As another example, the training module 514 may provide an input UIs logs to one or more than one sequential pattern mining algorithms (including but not limited to Generalized Sequential Pattern (GSP), FreeSpan, Sequential PAttern Discovery using Equivalence classes (SPADE), Long Short-Term Memory (LSTM), etc.) and/or MLAs in parallel. The training module 514 may compare the output of the different sequential pattern mining algorithms and/or MLAs to retain those with the highest reliability.

The above example is associated with the supervised learning. However, in certain embodiments, the training module 514 may be configured to rely on unsupervised learning, semi-supervised learning or reinforcement learning techniques to train the MLAs. The technique used to train the MLAs should not limit the scope of present disclosure.

It is to be noted that the training module 514 may be configured to train several sequential pattern mining models or MLAs for different applications such as for determining if the user 116 required assistance while performing a particular task or to complete the task, determining the task user is attempting based on UIs, determining if the user 116 is requesting for assistance, providing the requested assistance to the user 116 or the like.

Going back to FIG. 4, the background analysis module 506 may perform background analysis of real-life UIs. The background analysis of a real-life UIs may be referred to as analysis of live UIs performed by the user 116. In certain embodiments, such analysis may be performed in the background and may not be directly visible to the user 116. The real-life UIs of the user 116 may include the real-life user navigations and interactions with the GUI 118. In certain embodiments, the real-life user navigations and interactions with the GUI 118 may include clicks (e.g. mouse clicks, touch inputs on touch screens or the like) by the user 116 on the elements of GUI 118 (e.g. button, dropdown selection, checkbox, or the like), inputs (e.g. text inputs, numeral inputs or the like) from the user 116, sequence of actions performed or the like.

To perform background analysis, in certain embodiments, the background analysis module 506 may use the trained sequential pattern mining models or MLAs. The background analysis module 506 may provide the real-life UIs as tracked and stored by the tracking and storing module 502 as input to the trained sequential pattern mining models or MLAs to identify sequence pattern of the real-life UIs. The trained sequential pattern mining models or MLAs may identify and provide as output one or more real-life sequence patterns to be associated with the real-life UIs corresponding to the task the user 116 may be attempting to perform. Such sequence patterns may include a series of steps being performed by the user 116 corresponding to the task such as filling up of some forms, saving some actions, searching some actions or the like.

In certain embodiments, the background analysis module 506, based on the one or more real-life sequence patterns, may identify the task that the user 116 may be attempting to perform (e.g. setting an appropriate price of a material). Once the task is identified, the background analysis module 506 may determine if the user 116 requires assistance while performing a particular task or to complete the task. The background analysis module 506 may correlate the identified one or more real-life sequence patterns associated with the task that the user is attempting to perform with previously identified one or more sequence patterns associated with a similar task performed previously to determine if the user 116 requires assistance. In yet another embodiment, the background analysis module 506 may be configured to determine that the user requires assistance to complete the task by comparing a time taken by the user attempting to perform the task with a previous time taken by the previously performed task. In certain embodiments, the previously performed task may have been performed by some other user.

In certain embodiments, the background analysis module 506 may use a previously trained sequential pattern mining models or MLAs for determining if the user 116 requires assistance while performing a particular task or to complete the task. To this end, the background analysis module 506 may input the previously trained sequential pattern mining models or MLAs with the one or more real-life sequence patterns and one or more previously identified sequence patterns associated with same task. The output previously trained sequential pattern mining models or MLAs may be a decision or a status in terms of 'Yes' or 'No' such as, binary values '1' for 'Yes' and '0' for 'No'.

In certain embodiments, to train the sequential pattern mining models or MLAs for determining if the user 116 requires assistance while performing a particular task or to complete the task, the training module 514 may use the one or more real-life sequence patterns and one or more previously identified sequence patterns associated with same task. The training module 514 may perform various operations for example, the training module 514 may determine that the steps of the task identified in the one or more real-life sequence patterns are in a proper sequence when compared with the sequence of steps of the task identified in the one or more previously identified sequence patterns, the one or more real-life sequence patterns includes all the steps of the tasks when compared with the steps of the task identified in the one or more previously identified sequence patterns, the user 116 is taking time more than required to perform the steps of the task or the like.

In certain embodiments, if the user 116 required assistance while performing a particular task or to complete the task and have performed only few steps, the background analysis module 506 may assist the user 116 with the remaining steps. By way of example, the user 116 may be setting an appropriate price of a material (e.g. blueberries muesli) given that the sale of the material is getting affected due to high selling price. The user 116 may set the price of the material using the prices and inventory application 366-1, however, the user 116 may not know how to set marketing budget after changing the price. In such situations, based on previously identified sequence pattern associated with a similar task, the background analysis module 506 may assist the user 116 with setting the marketing budget using the marketing expenses application 368-1.

After determining the status of the user 116 that the user 116 requires assistance while performing a particular task or to complete the task, in certain embodiments, the assistance module 508 may be operated to guide the user in completing the task. In certain embodiments, the assistance module 508 may be configured to provide a notification on the GUI 118. In certain embodiments, the assistance module 508 may provide a notification using notifications 314. In certain embodiments, the assistance module 508 may operate in conjunction with the background analysis module 506 to assist the user 116 with the required guidance.

The user 116 may click on the notifications 314 icon in the GUI 118 to see what kind of notification the assistance module 508 is providing. In certain embodiments, the notifications may provide intimation to user 116 such as, for example, the intimations may include a suggestion to perform the task in accordance with the notification. In certain embodiments, instead of providing the notification using notifications 314, the assistance module 508 may be configured to provide a pop-up notification on the display 208 associated with the client device 110. The pop-up notification may provide an option to either accept the assistance provide by the assistance module 508 or cancel the pop-up notification.

In the event that the user 116 has opted for the assistance based on the notification, the assistance module 508 may provide guided steps to user in any suitable form. For example, in certain embodiments the guided steps may be provided in the form of a dialogue box with readable text. In other embodiments, the assistance module 508 may provide an audible guidance narrating the steps to follow. In yet another embodiment, the assistance module 508 may provide guided steps in the form of a video displayed on the display 208 associated with the client device 110. It is to be noted that how the assistance module 508 provides the guidance should not limit the scope of present disclosure.

It is to be noted that the notifications provided by the assistance module 508 may be automatically generated based on the one or more real-life sequence patterns and one or more previously identified sequence patterns associated with the task. However, in certain embodiments, the user 116 may also request for assistance to perform steps of the task.

Figure 7:
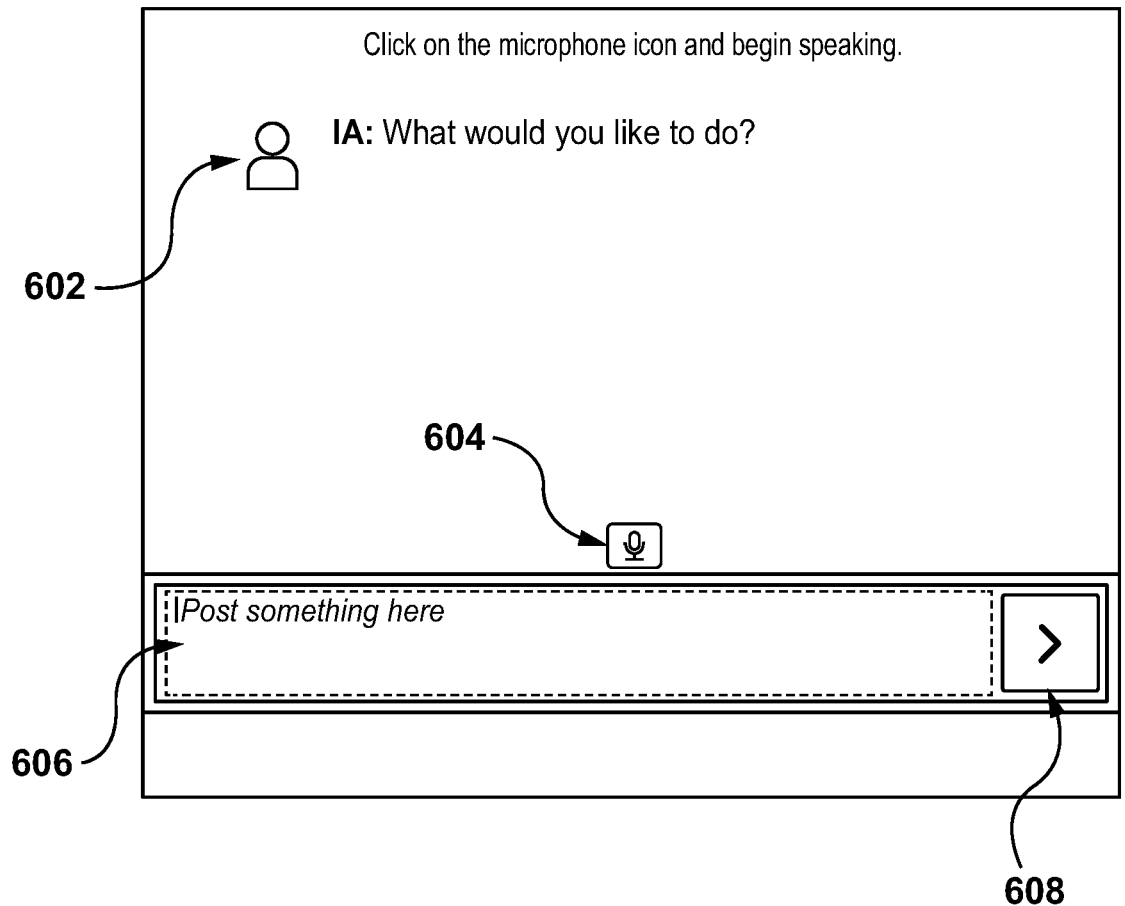
FIG. 7 illustrates a GUI corresponding to an intelligent assistance provided to the user, in accordance with various embodiments of the present disclosure.

In certain embodiments, the user 116 may select the intelligent assistant 310 option in the GUI 118 request for assistance. FIG. 7 illustrates a GUI corresponding to the intelligent assistant 310, in accordance with various embodiments of the present disclosure. As shown, the intelligent assistant 318 may include interactive area 602, a microphone icon 604, a text box 606, an enter button 608. It is contemplated that the intelligent assistant 310 may include other options but have not been illustrated for the purpose of simplicity.

The intelligent assistant 310 may be configured to answer inquiries through speech recognition and command as well as text. In certain embodiments, the user 116 may choose to type questions within the text box 606 and submit the questions by clicking the enter button 608. In other embodiments, the user 116 may click on the microphone icon 604 to speak and request assistance. In so doing, the intelligent assistant 310 may activate microphone 212 associated with the client device 110.

In certain embodiments, the user 116 may provide his/her question to the intelligent assistant 310 in any suitable manner as mentioned above. The intelligent assistant 310 may provide a solution to the question in the interactive area 602. By way of example, the intelligent assistant 310 may communicate with the assistance module 508 to provide the solution. In certain embodiments, the assistance module 508 may convert the previously identified sequence pattern associated with the task and the corresponding steps to perform the task into user readable steps. The intelligent assistant 310 may display the user readable steps in the interactive area 602.

In certain embodiments, instead of clicking on the intelligent assistant 310 in the GUI 118, the assistance module 508 may be configured to determine a gesture that the user 116 is making to seek assistance. In one embodiment, such gesture may include an audible request made by user 116 by using some specific words such as, for example, "Need Help", "Hey System" or the like. In another embodiment, such gesture may include a physical gesture made by the user 116 such as for example, waving hands in front of camera 216 associated with the client device. The assistance module 508, using the trained sequential pattern mining models or MLAs, may be configured to determine such gestures and may initiate the intelligent assistant 310. In certain embodiments, the training machine learning module 504 may also be configured to train the sequential pattern mining models or MLAs for recognizing the gestures of the user 116.

Thus, by virtue of the intelligent assistance system 500, the ERP system 100 may assist the user to operate various integrated applications associated with the ERP system in an efficient manner.

Figure 8:
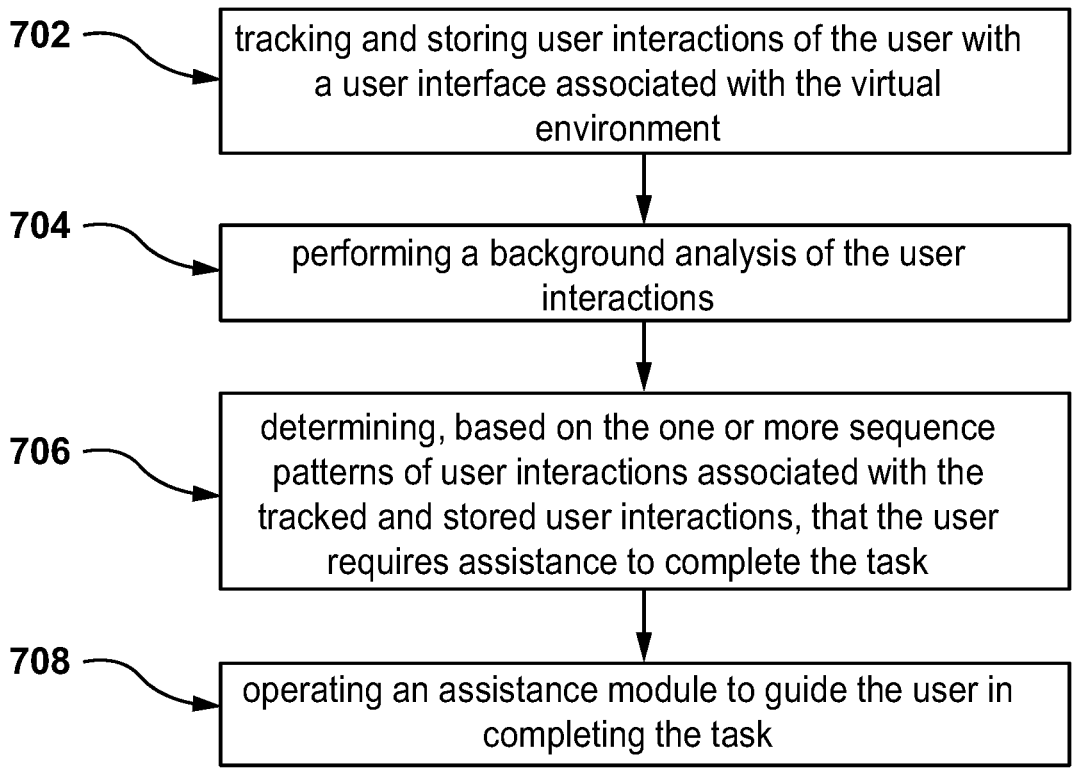
FIG. 8 depicts a flowchart representing a process corresponding to the intelligent assistance method implemented on the ERP system, in accordance with various embodiments of the present disclosure.

FIG. 8 depicts a flowchart representing a process 700 corresponding to an intelligent assistance method implemented on the ERP system 100, in accordance with various embodiments of the present disclosure.

As shown, the process 700 begins at step 702 where the ERP system 100 tracks and stores user interactions of the user with a user interface associated with the virtual environment, the user interactions being associated with the user attempting to perform a task in the virtual environment. As previously discussed, the tracking and storing module 502 may be configured to keep a track of interactions of the user 116 with the GUI 118 and store the user interactions (UIs) as logs in a memory associated with the client device 110 and/or server 114.

The process 700 moves to step 704 where the ERP system 100 performs a background analysis of the user interactions, the background analysis comprising: inputting one or more of the tracked and stored user interactions to a machine learning algorithm (MLA) having been previously trained to identify sequence pattern of user interactions and outputting, by the MLA, one or more sequence patterns of user interactions to be associated with the tracked and stored user interactions. As noted above, the background analysis module 506 may perform background analysis of real-life UIs. To perform background analysis, in certain steps, the background analysis module 506 may provide the real-life UIs as tracked and stored by the tracking and storing module 502 as input to the trained sequential pattern mining models or MLAs to identify sequence pattern of the real-life UIs. The trained sequential pattern mining models or MLAs may identify and provide as output one or more real-life sequence patterns to be associated with the real-life UIs corresponding to the task the user 116 may be attempting to perform.

The process 700 advances to step 706 where the ERP system 100 determines, based on the one or more sequence patterns of user interactions associated with the tracked and stored user interactions, that the user requires assistance to complete the task. As previously discussed, based on the one or more sequence patterns of user interactions associated with the tracked and stored user interactions, the background module 506 determines that the user requires assistance to complete the task.

Finally at step 708, the ERP system 100 operates an assistance module to guide the user in completing the task. As noted above, the assistance module 508 may be operated to guide the user in completing the task.

It is to be understood that the operations and functionality of the ERP system 100, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A computer-implemented method for assisting a user of a virtual environment, the method comprising:
   tracking and storing user interactions of the user with a user interface associated with the virtual environment, the user interactions being associated with the user attempting to perform a task in the virtual environment;
   performing a background analysis of the user interactions, the background analysis comprising:
      inputting one or more of the tracked and stored user interactions to a machine learning algorithm (MLA) having been previously trained to identify sequence patterns of user interactions;
      outputting, by the MLA, one or more sequence patterns of user interactions to be associated with the tracked and stored user interactions;
   determining, based on correlating the one or more sequence patterns of user interactions associated with the tracked and stored user interactions of the user with previously determined one or more sequence patterns associated with previously tracked and stored interactions performed by a different user, that the user requires assistance to complete the task; and
   operating an assistance module to guide the user in completing the task.

2. The method of claim 1, wherein determining that the user requires assistance to complete the task further comprises determining the task that the user is attempting to perform.

3. The method of claim 2, wherein the previously tracked and stored interactions performed by the different user correspond to the determined task.

4. The method of claim 1, wherein determining that the user requires assistance to complete the task further comprises:
   inputting one or more sequence patterns of the user interactions associated with the task that the user is attempting to perform and one or more sequence patterns of the user interactions associated with the previously tracked and stored interactions to a second MLA having been previously trained to identify sequence pattern of user interactions; and
   outputting, by the second MLA, a status determining that the user requires assistance.

5. The method of claim 1, wherein determining that the user requires assistance to complete the task further comprises comparing a time taken by the user attempting to perform the task with a previous time taken to perform the task.

6. The method of claim 1, wherein the one or more sequence patterns of user interactions associated with the tracked and stored user interactions include a sequence of one or more steps performed in order to accomplish the task.

7. The method of claim 1, wherein determining that the user requires assistance to complete the task further comprises providing a notification on the user interface.

8. The method of claim 7, wherein operating the assistance module is in accordance to the user's response to the notification on the user interface.

9. The method of claim 1, wherein operating the assistance module includes providing, by the operating module, guidance to perform steps associated with the task.

10. The method of claim 9, wherein the guidance to perform steps associated with the task is based on previously performed steps associated with the task.

11. The method of claim 9, wherein the guidance includes at least one of: i) a textual guidance, ii) an audio guidance, or iii) a video guidance.

12. The method of claim 1, wherein operating the assistance module is in accordance to a request of the user.

13. The method of claim 12, wherein the request is at least one of: i) a request submitted by the user using the user interface or ii) a gesture based request.

14. The method of claim 13 further comprising detecting, by a second MLA previously trained to detect gestures, the gesture based request.

15. The method of claim 13, wherein the gesture based request includes at least one of: i) an audio request or ii) a body movement based request.

16. The method of claim 1, wherein the user interface is a graphical user interface.

17. The method of claim 1, wherein the virtual environment is a transactional application.

18. A system for assisting a user of a virtual environment, the system comprising:
 a processor;
 a non-transitory computer-readable medium comprising instructions, the processor, upon executing the instructions, being configured to cause the system to:
  track and store user interactions of the user with a user interface associated with the virtual environment, the user interactions being associated with the user attempting to perform a task in the virtual environment;
  perform a background analysis of the user interactions, the background analysis comprising:
   inputting one or more of the tracked and stored user interactions to a machine learning algorithm (MLA) having been previously trained to identify sequence patterns of user interactions;
   outputting, by the MLA, one or more sequence patterns of user interactions to be associated with the tracked and stored user interactions;
  determine, based on correlating the one or more sequence patterns of user interactions associated with the tracked and stored user interactions of the user with previously determined one or more sequence patterns associated with previously tracked and stored interactions performed by a different user, that the user requires assistance to complete the task; and
 operate an assistance module to guide the user in completing the task.

19. The method of claim 1, wherein the MLA is a sequence pattern mining algorithm.

20. The method of claim 19, wherein the sequence pattern mining algorithm comprises one or more of Generalized Sequential Pattern (GSP), FreeSpan, Sequential Pattern Discovery using Equivalence classes (SPADE), or Long Short-Term Memory (LSTM).

* * * * *